United States Patent Office

3,806,402
Patented Apr. 23, 1974

3,806,402
STABLE VINYL ACETATE/N-METHYLOLACRYL-AMIDE LATEX WITH FULLY HYDROLYZED POLYVINYL ALCOHOL
Peter Fallon Stehle, Media, and Jack Dickstein, Huntingdon Valley, Pa., Samuel Loshaek, Stamford, Conn., assignors to Borden, Inc., New York, N.Y.
Filed Dec. 2, 1969, Ser. No. 881,613
The portion of the term of the patent subsequent to May 1, 1990, has been disclaimed
Int. Cl. B32b 21/18; C08f 37/18
U.S. Cl. 161—251                                    12 Claims

ABSTRACT OF THE DISCLOSURE

Novel stable vinyl acetate/N-methylolacrylamide copolymer latexes comprising fully hydrolyzed polyvinyl alcohol, specially suitable in water-resistant adhesives, are prepared by a method which comprises dispersing said polyvinyl alcohol in water in the presence of an anionic surfactant, adding thereto the vinyl acetate monomer and effecting polymerization while gradually adding the N-methylolacrylamide to the water medium at a specially controlled rate. Said method is also suitable with partially (at least 80%) hydrolyzed polyvinyl alcohols and over a wide range of viscosity types.

BACKGROUND OF THE INVENTION

It is known that copolymers of vinyl acetate with minor amounts of N-methylolacrylamide (VAc/NMA) provide excellent adhesive binders capable of cross-linking with the assistance of heat or acid catalysis. It is also known that latexes of polyvinyl acetate may be prepared by polymerization in the presence of polyvinyl alcohol and that certain properties of such latexes can be tailor-made by suitable choice of polyvinyl alcohol with regard to molecular weight and degree of hydrolysis.

Attempts have been made to combine the advantages of both N-methylolacrylamide and polyvinyl alcohol in the preparation of the same polyvinyl acetate latex. However, such attempts have had only partial success. Unstable latexes have resulted except when the polyvinyl alcohol was limited to relatively narrow ranges of molecular weight and degree of hydrolysis.

The difficulty arises from the fact that N-methylolacrylamide is highly soluble in water and practically insoluble in vinyl acetate monomer so that the N-methylolacrylamide tends to polymerize with itself in the water, resulting in a non-homogeneous product of polymerization mixed non-uniformly with the polyvinyl alcohol and tending to coagulate during polymerization or to gel shortly thereafter.

This difficulty has been recognized by the patentees of U.S. 3,301,809 who tried a variety of emulsifying systems to emulsion-copolymerize vinyl acetate with N-methylolacrylamide and came to the conclusion that the only such system which would give a stable latex was a polylvinyl alcohol hydrolyzed to the extent of from about 80 to about 90% and having in addition the limitation that its standard viscosity must be in the range of from about 5 to about 25 centipoises.

Such narrow limitations as to type have correspondingly limited the usefulness of polyvinyl alcohols in tailor-making VAc/NMA latex properties. Thus, the restriction against using polyvinyl alcohols of viscosity grade higher than 25 cps. has prohibited making latexes having viscosity high enough for application on certain coating machines. Likewise, the restriction against using polyvinyl alcohol hydrolyzed to an extent of more than about 90% has prohibited exploitation of the inherent high water-resistance possessed by the so-called "fully hydrolyzed" polyvinyl alcohols. The incentive to overcome this deficiency is particularly strong in view of the growing demand in the trade for adhesives forming superior water-resistant bonds.

SUMMARY OF THE INVENTION

A means has now been found whereby stable aqueous latexes of vinyl acetate copolymers with N-methylolacrylamide can be made in the presence of a wide selection of polyvinyl alcohols including fully-hydrolyzed polyvinyl alcohol. Briefly stated, the present invention comprises the steps of: (1) making an aqueous emulsifying medium by dissolving in water between about 2 and about 8 parts by weight of polyvinyl alcohol and between about 0.05 and 2.0 parts by weight of an anionic surfactant, (2) dispersing in said medium 100 parts vinyl acetate, (3) adding thereto a free-radical donating initiator to effect polymerization while (4) gradually adding to the aqueous medium between about 0.5 and about 10 parts by weight of N-methylolacrylamide at a rate maintained at between about 0.01 and about 0.03 part per minute for at least about 85% of the total addition.

This invention also includes the novel latexes made in the manner of this invention which have proved surprisingly to be shelf-stable for periods of at least three months without separation or gelation, even at solids content as high as 60% by weight.

The method of the instant invention is operative over a wide range of polyvinyl alcohol viscosity. In the case of latexes made with fully hydrolyzed polyvinyl alcohols according to the method of this invention it has been found that even though these latexes contain water-sensitive surfactants which might be expected to neutralize the water-resistant property conferred by the fully hydrolyzed polyvinyl alcohol, the latexes are, in fact, superior water-resistant glues, giving bonds which have stronger resistance to water than latexes of corresponding vinyl acetate/N-methylolacrylamide composition prepared with partially hydrolyzed polyvinyl alcohol.

DETAILED DESCRIPTION

This invention relates to a method of making stable latexes of vinyl acetate/N-methylolacrylamide (VAc/NMA) copolymers in the presence of polyvinyl alcohol and particularly in the presence of those grades of polyvinyl alcohol which are not successfully utilizable in previously disclosed procedures for making VAc/NMA latexes.

The method of this invention can be carried out using a wide variety of polyvinyl alcohols. Stable latexes of vinyl acetate copolymers containing up to 10% N-methylolacrylamide can be made with any water soluble polyvinyl alcohol having standard viscosity in the range from about 3 to about 125 centipoises (the standard viscosity being determined as usual on a 4% aqueous solution at 20° C.). Stable latexes of said copolymers also result when the polyvinyl alcohol is any water soluble grade whose extent of hydrolysis is between about 80% and 100%.

Since a main objective of this invention is to make copolymer latexes which have superior water-resistant properties in glues, the invention will be illustrated chiefly with the preparation of stable latexes with the so-called "fully-hydrolyzed" classification which includes polyvinyl alcohols which are at least 91% hydrolyzed. For best performance in glues it is preferred to use polyvinyl alcohols which are at least 97% hydrolyzed and in particular those which are greater than 99% hydrolyzed.

Another objective of this invention is to make stable latexes of VAc/NMA copolymers using polyvinyl alcohols partially hydrolyzed to the extent of between about 80 and about 90% but also having a standard viscosity of between about 30 and 60 centipoises. These types will be hereinafter referred to as HVPH types ("high viscosity, partially hydrolyzed").

According to this invention substantially all the vinyl acetate is first emulsified in an aqueous medium comprising the polyvinyl alcohol, and the N-methylolacrylamide is subsequently added gradually into the aqueous medium during the course of polymerization. A major feature of the invention is the inclusion in the aqueous polyvinyl alcohol of a small amount of an anionic surfactant. Another feature of the invention is that the rate of adding the N-methylolacrylamide is carefully controlled as will hereinafter be described.

When it is attempted to make a VAc/NMA latex with a polyvinyl alcohol that is either fully hydrolyzed or an HVPH type, if vinyl acetate is first added to the emulsifying medium, as in this invention, but without the presence of the surfactant or without careful control of the N-methylolacrylamide addition, unstable latexes invariably result.

An alternative method for obtaining stable latexes of VAc/NMA copolymers, which likewise works with a wide selection of polyvinyl alcohols, is the subject of applicants' copending application Ser. No. 881,580, filed Dec. 2, 1969, now abandoned. The alternative method comprises gradual addition of both vinyl acetate and N-methylolacrylamide to an aqueous dispersion of the polyvinyl alcohol.

The amount of polyvinyl alcohol used in the method of the instant invention can conveniently be between about 2 and about 8 parts by weight per 100 parts of vinyl acetate monomer. For best results it is preferred to use between about 3 and about 5 parts by weight polyvinyl alcohol for 100 parts of vinyl acetate monomer.

The anionic surfactant used in this invention can be any such surfactant capable of generating latex particles. The amount used for optimum overall effect will depend partly on the level of polyvinyl alcohol used as well as upon the level of N-methylolacrylamide to be copolymerized. Other factors will occur to those skilled in the art and the optimum amounts for any specific product would be selected by experimentation as is known to practitioners of emulsion polymerization. In general, effective amounts of surfactant may be selected from between about 0.01 and about 2.0 parts based on weight of vinyl acetate monomer. Preferably, from about 0.1 to 0.5 parts are used, and more particularly between about 0.1 and 0.25 parts. The surfactant may be added to the water before, after or simultaneously with the addition of the polyvinyl alcohol. However, for the purpose of easily ascertaining when the polyvinyl alcohol is completely dissolved, it is preferred to disperse the polyvinyl alcohol in water first and then add the surfactant to the clear solution of polyvinyl alcohol.

Sodium lauryl sulfate has been found by applicants to be a particularly useful surfactant in the method of this invention. Other useful surfactants include sodium N-alkyl sulfosuccinamates, such as are available commercially under the names Aerosol 18 and Aerosol 22; dialkyl esters of sodium sulfosuccinic acid, such as are available commercially as Aerosol OT and Aerosol MA; the sodium or ammonium salts of the sulfate ester of an alkyl phenoxy poly (ethylene oxy) ethanol, such as are available commercially as Alipal CO–433 and Alipal CO–436; the sodium salt of an alkyl aryl polyether sulfonate, such as is available commercially as Triton X–200; and alkyl aryl sodium sulfonates, such as for example Siponate DS–10.

The amounts of N-methylolacrylamide which can be copolymerized according to the method of this invention can vary from substantially not less than 0.5% up to about 10% of the weight of vinyl acetate monomer. The amount selected for a particular product depends, among several factors, upon the degree of cross-linking desired and upon the degree to which the N-methylolacrylamide is depended upon as a contributor to the colloid stability of the latex particles. In view of the ability of N-methylolacrylamide to contribute to stability when properly copolymerized, smaller amounts of polyvinyl alcohol can be used when larger amounts of N-methylolacrylamide are incorporated. Of course, the end properties of the product as a glue also depend upon the absolute and relative amounts of polyvinyl alcohol and N-methylolacrylamide and the accomplished practitioner will select a combination of these factors giving the particular balance of properties needed for a specific intended end-use. In the experience of the applicants, best overall results have been obtained by maintaining the polyvinyl alcohol within the range of about 3 to 5 parts and the N-methylolacrylamide in the range of about 1.5 parts to 5 parts, more particularly in the range of 2.5 to 5.0 parts, per 100 parts by weight of vinyl acetate monomer.

In order to gain optimum colloid stability and optimum uniformity of copolymerization ratio, it is extremely important to control the rate with which the N-methylolacrylamide is added to the reacting aqueous emulsion medium. This rate, especially with either fully hydrolyzed or HVPH types of polyvinyl alcohol, should not vary significantly from between about 0.01% and 0.03%, based on weight of vinyl acetate monomer, per minute regardless of the overall level of N-methylolacrylamide. For best results it is preferred to maintain said rate between about 0.015 and about 0.025 parts per minute. While applicants have found that the rate may be changed for short periods during the addition to magnitudes outside of this stated range, not more than about 15% of the total addition can be carried out in such deviate manner without seriously affecting the stability of the end-product. For best results it is preferred that at least about 94% and in particular at least about 97% of the N-methylolacrylamide addition be carried out at a rate between about .01% and 0.03% and in particular between about 0.015 and 0.025 parts per minute. When deviations in addition rate inadvertently occur, it is preferred to make compensating adjustments to restore the average rate to within the stated range. Thus, for example, a product which is to contain 10% of N-methylolacrylamide will require 33 to 100 minutes addition time and a product which is to contain 10% of N-methylolacrylamide will require between 333 and 1000 minutes to add the total amount of N-methylolacrylamide.

This close control of the N-methylolacrylamide addition is not by itself sufficient for the invariable obtainment of stable latexes of water-resistant VAc/NMA copolymers. When fully hydrolyzed and HVPH types of polyvinyl alcohol are used, and when the vinyl acetate is all emulsified initially as in the present procedure, it is also required to have anionic surfactant present.

While applicants do not wish to be limited in any way by theoretical interpretation, it seems reasonable to attribute the unexpected success of this combination of conditions to the following factors. In the first place, the surfactant insures that latex particles are present substantially instantaneously at the start of NMA addition, thus insuring also that NMA will tend to be incorporated in particles rather than build up undesirable homopolymer in the aqueous phase.

Furthermore, the rigid requirement as to the rate of NMA addition discovered by the applicants can be considered as reflecting the need for balancing two effects which the added N-methylolacrylamide has on the polymerizing system. On the one hand the presence of an excess of N-methylolacrylamide retards the polymerization of vinyl acetate. On the other hand, if properly incorporated, it lends stability to the latex. When the rate is controlled according to the instant invention, said retardation is just sufficient to maintain a substantially constant ratio of copolymerized vinyl acetate to N-methylolacrylamide. At the conclusion of addition, therefore, the remaining vinyl acetate and N-methylolacrylamide monomers are present substantially also in said ratio; polymerization is completed quickly, as evidenced by very small residual exotherm.

In a run properly controlled according to the method of this invention, reaction ceases within at least 15 minutes after the addition of N-methylolacrylamide is completed. With such uniform incorporation of the comonomers, stability of latex and chrosslinking efficiency of copolymer tend to be maximized.

If N-methylolacrylamide is added too fast, the polymerization of vinyl acetate is retarded excessively and a copolymer disproportionately rich in N-methylolacrylamide is formed. A large quantity of vinyl acetate then remains after addition of N-methylolacrylamide is completed and there is a long period of slow reaction, presumably until the N-methylolacrylamide is exhausted, followed by rapid reaction of the remaining vinyl acetate. This phase of the polymerization occurs without the stabilizing effect of the N-methylolacrylamide and the polymer does not readily crosslink. The magnitude of deficiency is of course dependent on the degree of variance from the optimum rate. Thus an addition rate slightly too fast leads to polymers of slightly reduced stability.

Contrariwise, if the rate of N-methylolacrylamide is too slow, vinyl acetate polymerizes with itself too rapidly and the copolymer contains less incorporated N-methylolacrylamide than needed for latex stability and crosslinking capacity. As vinyl acetate monomer diminishes, the concentration of added N-methylolacrylamide builds up and becomes polymerized to water soluble homopolymer or near-homopolymer. The resulting latex tends toward dilatancy and shows poor shelf stability at best. Water resistance also is poor.

Experience has shown that the optimum rate of N-methylolacrylamide addition will depend somewhat on the type and quantity of both surfactant and polyvinyl alcohol, as well as upon the total amount of N-methylolacrylamide added. Some of these effects are reflected in the conditions illustrated in examples below. For instance, in case C of Example 5, when the NMA level is 3.5%, approximately the optimum rate is 0.0195 part per minutes, requiring three hours for total addition. Under these conditions, the vinyl acetate is substantially completely polymerized in said three hours. However, when the level of NMA is increased to greater than 3.5% and this also is added at the rate of 0.0195 part per minute, requiring greater than three hours for complete addition, the retardation of vinyl acetate is not sufficient to prolong its reaction over the prolonged addition time. Thus a substantial portion of the added NMA remains after the vinyl acetate has been completely polymerized, the intended higher level of NMA is not incorporated into copolymer with vinyl acetate, and the remaining amount is left to homopolymerize. Therefore the rate of addition of N-methylolacrylamide must be adjusted upwards to retard the vinyl acetate sufficiently to correspond in constant ratio to said rate of addition. On the other hand, when smaller levels of NMA are used, the rate of addition must be adjusted downward. Appropriate rates for several levels of NMA are illustrated in the examples given further below.

The emulsion copolymerization of this invention may be carried out in the usual types of reactors known to those familiar with the art. Such reactors are equipped with various accessories including reflux condenser, heating jackets, means of agitation and means of both slugwise and gradual metered addition of reactants. When using the preferred thermally activated initiators, it is preferred to carry out the major portion of the polymerization under close to reflux conditions at a temperature in the range between about 60 and 80° C., more particularly between about 65° and 68° C. However, when the initiator system includes a reducing agent, lower temperatures may be used in the range between about 0° C. and 60° C.

The free-radical donating initiator of this invention can be selected from any of the initiators for aqueous emulsion copolymerization known in the art including those which undergo scission under the influence of heat and those which are caused to form free radicals by reaction with reducing agents. Water-soluble type initiators are usually to be preferred including potassium persulfate, sodium persulfate, ammonium persulfate, hydrogen peroxide, and others which will be known to those skilled in the art. When reducing agents are used it is again preferred to use materials which are water soluble such as sodium formaldehyde sulfoxylate, sodium metabisulfite, and ascorbic acid. The amounts to be used will depend upon the rate of polymerization desired and upon other factors which are well-known in the art. Preferably, the aqueous emulsifying composition contains between about 0.01% and 5%, especially from 0.03% to 2% by weight of the initiator. If a reducing agent is used, this also is used in amount totaling between about 0.01% and 5%, especially from 0.03% to 2% by weight of the aqueous emulsifying composition.

This invention will be further illustrated by description in connection with the following specific examples of the practice of it, wherein proportions are in parts by weight unless otherwise stated.

EXAMPLE 1

A ten-gallon stainless steel reactor provided with a proper agitator and reflux condenser was charged with 90.5 parts by weight of deionized water, 4.0 parts of a grade of polyvinyl alcohol characterized as 99–100% hydrolyzed and 30 cps. viscosity. When the polyvinyl alcohol was completely dispersed, as indicated by a clear solution, 0.25 part of sodium lauryl sulfate was added and homogenized. Then 97.5 parts of vinyl acetate monomer was added, the reactor and its contents were purged of air by means of nitrogen gas. The reactor was then heated to about 58° C. and a solution of 0.05 part of ammonium persulfate in 1.0 part water was added. Continued heating brought the temperature to 62° C. in eight minutes.

At this point, addition was begun of a feed composed of a solution 2.5 parts of N-methylolacrylamide in 12.5 parts water, the rate of addition being such that it required 2.5 hours to complete. The temperature of the reactor reached 68° C. within fifteen minutes after gradual addition was started. Temperature was held at about 68° throughout the addition and until diminished exotherm indicated that reaction was practically complete. Temperature was then raised to 90° C. for an additional twenty minutes. The product latex was then cooled and discharged through a nylon knit cloth into drums. The latex was found to have 49.1% solids and a pH of 4.9. A negligible amount of coagulum was found on the nylon cloth. Colloid stability of the latex was excellent. Viscosity as measured on a Brookfield viscosimeter with LVF spindle 4 at 60 r.p.m. was 2000 cps.

Intrinsic viscosity

Thin films cast from this latex were vacuum-dried at room temperature. Sufficient dried film was added to acetone to prepare a solution of concentration between 0.5 and 1.0%. This solution was passed through a fine filter to remove any insoluble matter and a precise determination of solids content was made. The filtrate and dilutions thereof were then used to determine the intrinsic viscosity as described, for example, in Flory, "Principles of Polymer Chemistry" 1953, page 309. Viscosities of the acetone solutions were determined at 30° C. using a Cannon-Fenske modification of the Ubbelohde viscosimeter. Results obtained by this procedure have been found to be in agreement with results obtained when the polymer was coagulated and washed free of polyvinyl alcohol and other water-soluble materials.

The intrinsic viscosity determined in this manner for the polymer recovered from the latex of this example was equal to 2.5.

Crosslinkability

The ability of the solids portion of the latex to crosslink was evaluated as the percent insoluble in acetone after treatment with heat or acid catalyst.

To evaluate crosslinking by heat, films were cast from the latex, vacuum dried at room temperature and then placed in an oven at 150° C. for 30 minutes. Two parts of the "cured" film were equilibrated with 98 parts of acetone at 25° C. This weight of undissolved material was determined and expressed as percent insoluble. The oven-cured material from the latex of this example was found by this method to be 90% insoluble.

To evaluate crosslinking by acid catalyst, 5 parts of a 50% aqueous solution of aluminum chloride were added to 100 parts of latex. Films cast from this mixture were then vacuum dried at room temperature. After storage at 22° C. for seven days, solubility in acetone was determined in the same manner as used on heat-cured material. The acid-cured material from the latex of this example was found by this method to be 89%.

Adhesion tests

Evaluation of adhesive strength was carried out according to the procedure outlined in Section 4 of the Department of Commerce National Bureau of Standards Product Standard No. PS-1-66. Five parts by weight of aluminum chloride catalyst was added to 100 parts of latex. This mixture was applied to fir veneer at 45 lbs. per 1000 sq. ft. single glue line to form a three-pyl board. This was pressed five minutes after assembly at 150 p.s.i. for one hour at room temperature. After conditioning at 50% RH and 70° F. for seven days, the assemblies were tested according to the above cited procedures.

When the latex of this example was tested in this manner, the percent of wood failure observed was 95% after drying, 90% after the boil cycle and 93% after the vacuum-pressure cycle.

EXAMPLE 2

The same procedure was used as in Example 1 except that the charge of the initial 99–100% hydrolyzed polyvinyl alcohol was reduced to 2.0 parts, the amount of vinyl acetate monomer was 94.0 parts, the sodium lauryl sulfate was replaced by an equal amount of a sodium-N-alkyl sulfosuccinamate commercially available as Aerosol 22 and the N-methylolacrylamide feed was an aqueous solution containing 6.0 parts N-methylolacrylamide. The time taken to feed the N-methylolacrylamide solution was 285 minutes, corresponding to a rate of 0.0210 part per minute. The product latex had a solids content equal to 46.9% and pH 4.6; the coagulum remaining on the nylon cloth was negligible and colloid stability was found to be excellent.

EXAMPLE 3

The procedure of Example 1 was followed excepting that the sodium lauryl sulfate was increase to 1.0. The N-methylolacrylamide solution addition time was 130 minutes, corresponding to a rate of 0.0192 parts per minute. The product contained negligible coagulum at 48.3% solids and a viscosity equal to 2900 cps., pH was 4.7, intrinsic viscosity of the recovered polymer at 30° C., was 2.6.

Crosslinking tests carried out as in Example 1 indicated that the oven-cured material from the latex of the present example was 90% insoluble in acetone, and the acid-cured material was 88% insoluble in acetone. The latex of this example was stable for at least three months.

EXAMPLE 4

The procedure of Example 1 was followed excepting that the amount of vinyl acetate was increased to 96.5 parts and the N-methylolacrylamide was increased to 3.5 parts; also the surfactant was changed to 0.125 parts of tetrasodium N-(1,2-dicarboxy ethyl)-N-octadecyl sulfosuccinamate available as Aerosol 22. Time for addition of the N-methylolacrylamide solution was 210 minutes, corresponding to a rate of addition of 0.0167 parts per minute. The finished latex, prepared with negligible coagulum, had solids content of 46.2% and a pH equal to 4.8. Viscosity was 2300 cps. Intrinsic viscosity of recovered polymer was 2.8 at 30° C. Acetone insolubility tests after exposure to 150° C. for 30 minutes and after acid-cure were respectively 93% and 91%. Adhesion tests carried out according to the procedure described under Example 1 showed 98% wood failure for dry shear, 95% wood failure after the boil cycle and 95% wood failure after the vacuum-pressure cycle.

EXAMPLE 5

Using the procedure of Example 1, a series of experiments were run as summarized in the accompanying table. In all cases 4.0 parts of 99–100% hydrolyzed polyvinyl alcohol were used and the initiator was ammonium persulfate in the amount of 0.05 parts. In all cases latexes were obtained which were shelf stable for at least three months. The results show that the total time for addition of N-methylolacrylamide was increased after the proportion of N-methylolacrylamide was increased.

|  | A | B | C | D |
| --- | --- | --- | --- | --- |
| NMA[1] | 2.5 | 3.0 | 3.5 | 4.Z |
| Surfactant (SLS)[2] | .25 | .125 | .125 | .25 |
| Addition: |  |  |  |  |
| Time/min | 150 | 160 | 180 | 200 |
| Rate/parts/min | .0167 | .0188 | .0195 | .0225 |
| Percent solids | 49.1 | 47.3 | 47.0 | 46.7 |
| Viscosity | 2,000 | 2,100 | 2,400 | 3,500 |
| pH | 4.9 | 4.7 | 4.7 | 4.5 |

[1] N-methylolacrylamide.
[2] Sodium lauryl sulfate.

EXAMPLE 6

A run was attempted using the composition of Example 5C and identical procedural conditions with the exception that no surfactant was used. Polymerization was very sluggish and the latex became very viscous, indicating that N-methylolacrylamide homopolymerization was taking place. Observation of exotherm showed that polymerization was continuing for 1.5 hours after the N-methylolacrylamide addition had been concluded. The latex coagulated before it could be removed from the reaction vessel. This example is not an illustration of the instant invention but illustrates the need of surfactant in carrying out the procedure of the instant invention.

EXAMPLE 7

The procedure of Example 1 was followed except that the N-methylolacylamide was added at a rate designed to require five hours, namely, 0.0083 parts per minute. A strongly exothermic reaction occurred before N-methylolacrylamide addition was completed and the latex coagulated.

On the other hand, when the procedure of Example 5C was followed except that a 90-minute addition schedule, corresponding to .039 parts per minute, was used polymerization was sluggish, a very viscous latex was produced, showing a long post-addition period of polymerization and the product was unstable.

These two experimental runs illustrate unsatisfactory results which are obtained when rates of N-methylolacrylamide addition are attempted which are either slower or faster than the range of addition rates required for the proper operation of the instant addition.

EXAMPLE 8

Using the procedure of Example 1, 96.5 parts of vinyl acetate was copolymerized with 3.5 parts of N-methylolacrylamide added over a period of 180 minutes to an emulsifying phase containing 0.125 parts sodium lauryl sulfate, 0.25 parts ammonium persulfate and 3 parts of a grade of polyvinyl alcohol characterized as 93–94% hydrolyzed and 26 cps. viscosity. The finished latex had 48.1% solids, pH equal to 4.6 and Brookfield viscosity (4/60) equal to 6600 cps. The latex was stable after three months storage.

EXAMPLE 9

The same procedure as in Example 8 was followed except that the polyvinyl alcohol was 4 parts of a grade characterized as 87–88% hydrolyzed and 22 cps. viscosity. The finished latex had 46.8% solids, pH equal to 4.8 and viscosity equal to 1700 cps. This latex also was stable after three months' storage.

EXAMPLE 10

The same procedure as in Example 9 was followed except that the polyvinyl alcohol was a grade characterized as 87–88% hydrolyzed and 42 cps. viscosity. The finished latex had 47.3% solids, pH equal to 4.7 and Brookfield viscosity equal to 2600 cps. This latex remained stable over more than three months.

Examples 8, 9 and 10 illustrate the effectiveness of the method of this invention in making stable latexes having various end-viscosities by changing the type of polyvinyl alcohol. Examples 11 and 12 illustrate this effectiveness with polyvinyl alcohols which are substantially completely hydrolyzed.

EXAMPLE 11

The same procedure as in Example 8 was followed except that the polyvinyl alcohol was 4 parts of a grade characterized as 99.3–100 parts hydrolyzed and 125 cps. viscosity (a type designated in the trade as "Superhydrolyzed"). The finished latex had 45.5% solids, pH equal to 4.6, and Brookfield viscosity equal to 6100 cps. The latex was stable for more than three months.

EXAMPLE 12

The procedure of Example 11 was followed except that the vinyl acetate was increased to 97.5 parts, the NMA was decreased to 2.5 parts and added over a period of 130 minutes, and the polyvinyl alcohol was of a grade characterized as 99–100 parts hydrolyzed and 5 cps. The finished latex had 47.2% solids, pH 4.8 and a Brookfield viscosity equal to 600 cps. The latex remained stable longer than three months.

Examples 8 through 12 illustrate how the method of this invention can be used successfully to prepare stable latexes with polyvinyl alcohols covering a wide range in degree of hydrolysis and a wide range in magnitude of standard viscosity. They also illustrate how the method of this invention can be used to tailormake the latex viscosity by proper choice of polyvinyl alcohol type including types which have hitherto not been permissible because they have led to unstable products.

Latexes comprising fully hydrolyzed grades of polyvinyl alcohol made according to the method of this invention are especially remarkable for their performance as superior water-resistant adhesives. When tested according to procedures described in Example 1, they have consistently shown wood failure equal to at least 90% after the boil cycle. Strongly contrasting were the results obtained with a latex made according to the procedure of Example 1 excepting that the surfactant was omitted and the fully hydrolyzed polyvinyl alcohol was replaced by a grade of polyvinyl alcohol characterized as 87% hydrolyzed and standard viscosity of 22 cps. In a corresponding adhesion test, this latex, not made according to the method of this invention, showed only 57% wood failure after the boil cycle.

The latex made according to Example 1 has a similar advantage in withstanding the vacuum-pressure cycle. With greater than 90% wood failure after the vacuum-pressure cycle, it is far superior to the latex made without surfactant but with partially hydrolyzed polyvinyl alcohol—which showed only 56% wood-failure after the vacuum-pressure cycle.

The superiority in water-resistant bonding characteristic of latexes of the instant invention has also been demonstrated using the composition of Example 5C. Repeat batches of this formulation have consistently given wood failures of greater than 90%, both after the boil cycle and after the vacuum-pressure cycle. On the other hand wood failures of less than 65% were obtained after each of the respective cycles when a latex was used with the formulation of Example 5C excepting that the surfactant was omitted and the polyvinyl alcohol was replaced by a partially hydrolyzed type.

It is worthy of note that no additional adjuvants are required to convert the latexes of the instant invention into superior water-resistant glues. The above-described high levels of adhesive performance are achieved by the latexes themselves without further formulation such as with thermosetting resins. They therefore also have several advantages over such resin-modified types including improved color and longer maintenance of fluidity after mixture with catalyst.

It will be understood that it is intended to cover all changes and modifications of the examples of the invention herein chosen for the purpose of illustration which do not constitute departures from the spirit and scope of the invention.

What is claimed is:

1. A process for preparing stable aqueous latexes of the copolymers consisting essentially of vinyl acetate and N-methylolacrylamide which comprises the steps of:
   (a) preparing an aqueous emulsifying medium containing water; between 2 and 8 parts by weight of polyvinyl alcohol having a degree of hydrolysis greater than 91% and a viscosity of 30 to 125 cps., as determined at 20° C. with a 4% by weight aqueous solution; from 0.05 to 2.0 parts by weight of an anionic surfactant; 100 parts by weight of vinyl acetate; and sufficient amount of a free-radical donating initiator to effect polymerization; and
   (b) gradually adding to said medium between 0.5 and 10 parts by weight of N-methylolacrylamide at a rate maintained at between 0.01 and 0.03 part by weight per minute during the addition of at least 85% of the total N-methylolacrylamide.

2. Process of claim 1 wherein degree of hydrolysis of the polyvinyl alcohol is greater than 97%.

3. Process of claim 2 wherein the polyvinyl alcohol is used in amount between about 3 and about 5 parts, the N-methylolacrylamide is used in amount between about 1.5 and about 5 parts and added at a rate between about 0.015 and about 0.025 part per minute.

4. Process of claim 3 wherein the surfactant is selected from sodium lauryl sulfate, sodium N-alkyl sulfosuccinamates, dialkyl esters of sodium sulfosuccinic acid, sodium and ammonium salts of the sulfate ester of an alkylphenoxy poly (ethyleneoxy) ethanol, sodium salt of alkylaryl polyether sulfonates and sodium alkylaryl sulfonates.

5. Process of claim 1 which includes the step of heating said medium before commencing addition of the N-methylolacrylamide and maintaining the temperature in the range of 60° C. to 80° C. during its addition to promote formation of the vinyl acetate/N-methylolacrylamide copolymers.

6. Process of claim 5 wherein the polyvinyl alcohol is used in amount between about 3 and about 5 parts, the N-methylolacrylamide is used in amount between about 1.5 and about 5 parts and added at a rate between about 0.015 and about 0.025 part per minute.

7. Process of claim 1 wherein the surfactant is selected from sodium lauryl sulfate, sodium N-alkyl sulfosuccinamates, dialkyl esters of sodium sulfosuccinic acid, sodium and ammonium salts of the sulfate ester of an alkylphenoxy poly (ethyleneoxy) ethanol, sodium salt of alkylaryl polyether sulfonates and sodium alkylaryl sulfonates.

8. Process of claim 7 which includes the step of heating said medium before commencing addition of the N-methylolacrylamide and maintaining the temperature in the range of 60° C. to 80° C. during its addition to promote formation of the vinyl acetate/N-methylolacrylamide copolymers.

9. A solid substrate coated with a cross-link film consisting of a dry residue of an aqueous latex of a vinyl acetate/N-methylolacrylamide copolymer, said latex containing from 0.05 to 2.0 parts, per 100 parts by weight of the vinyl acetate, of an anionic surfactant; and from 2 to 8 parts by weight, per 100 parts by weight of the vinyl acetate, of polyvinyl alcohol having a degree of hydrolysis greater than 91% and a viscosity of 30 to 125 cps., determined at 20° C. with a 4% by weight aqueous solution.

10. Coated substrate of claim 9 wherein said substrate is wood.

11. A laminate comprising at least two solid substrates which are adhesively bound together by a cross-linked film consisting of a dry residue of an aqueous latex of a vinyl acetate/N-methylolacrylamide copolymer, said latex containing from 0.05 to 2.0 parts by weight, based on 100 parts by weight of the vinyl acetate, of an anionic surfactant and from 2 to 8 parts by weight, based on 100 parts by weight of the vinyl acetate, of polyvinyl alcohol having a degree of hydrolysis greater than 91% and a viscosity of 30 to 125 cps., determined at 20° C. with a 4% by weight of aqueous solution.

12. Laminate of claim 11 wherein said substrates are made of wood.

References Cited
UNITED STATES PATENTS 3,301,809  1/1967  Goldberg et al. ___ 260—29.4 U

OTHER REFERENCES

Davidson et al., "Water Soluble Resins," 2nd edition, Reinhold, New York, 1968, pp. 110–112.

ROBERT F. WHITE, Primary Examiner

J. B. LOWE, Assistant Examiner

U.S. Cl. X.R.

117—148; 161—250; 260—29.6 WB